(12) United States Patent
Clay

(10) Patent No.: US 10,698,961 B2
(45) Date of Patent: Jun. 30, 2020

(54) SEARCH ENGINE PARAMETER OPTIMIZATION

(71) Applicant: Bruce Clay, Simi Valley, CA (US)

(72) Inventor: Bruce Clay, Simi Valley, CA (US)

(*) Notice: Subject to any disclaimer, the term of this patent is extended or adjusted under 35 U.S.C. 154(b) by 230 days.

(21) Appl. No.: 15/974,593

(22) Filed: May 8, 2018

(65) Prior Publication Data
US 2019/0311068 A1    Oct. 10, 2019

Related U.S. Application Data

(60) Provisional application No. 62/653,959, filed on Apr. 6, 2018.

(51) Int. Cl.
| | |
|---|---|
| *G06F 16/00* | (2019.01) |
| *G06F 16/951* | (2019.01) |
| *G06F 16/957* | (2019.01) |
| *G06F 16/955* | (2019.01) |
| *G06F 40/14* | (2020.01) |
| *G06F 40/154* | (2020.01) |
| *G06F 40/284* | (2020.01) |

(52) U.S. Cl.
CPC .......... *G06F 16/951* (2019.01); *G06F 16/957* (2019.01); *G06F 16/9566* (2019.01); *G06F 40/14* (2020.01); *G06F 40/154* (2020.01); *G06F 40/284* (2020.01)

(58) Field of Classification Search
None
See application file for complete search history.

(56) References Cited

U.S. PATENT DOCUMENTS

| | | | |
|---|---|---|---|
| 7,216,121 B2 | 5/2007 | Bachman et al. | |
| 7,805,428 B2 | 9/2010 | Batista Reyes et al. | |
| 8,688,676 B2 | 4/2014 | Rush et al. | |
| 9,058,242 B2 | 6/2015 | Adams et al. | |
| 2009/0006311 A1 | 1/2009 | Ting et al. | |
| 2009/0292677 A1 | 11/2009 | Kim | |
| 2009/0299998 A1 | 12/2009 | Kim | |
| 2011/0016104 A1 | 1/2011 | Leconte | |
| 2012/0016857 A1 | 1/2012 | Gross et al. | |
| 2014/0108369 A1* | 4/2014 | Nijjer | H04L 63/08 707/706 |
| 2015/0248484 A1 | 9/2015 | Yu et al. | |
| 2016/0098380 A1 | 4/2016 | Rubino et al. | |
| 2016/0306877 A1* | 10/2016 | Winther | G06F 16/35 |

OTHER PUBLICATIONS

International Search Report and Written Opinion, dated Sep. 10, 2019, App. No. PCT/IB2019/054311.
Improve Its Positioning on Search Engines Thanks to Semantic Analysis (How to Improve Your SEO Positioning on Google Thanks to Semantic Analysis?).

* cited by examiner

*Primary Examiner* — Bai D Vu
(74) *Attorney, Agent, or Firm* — Nwamu, P.C.

(57) ABSTRACT

A search engine parameter optimization system and method. A search parameter metric that optimizes a new document is computed. The new document is optimized at the time content is created. The search parameter metric is based on a particular search engine and determines what is rewarded by the search engine. The search parameter is thus based on analysis of web-content that is highly ranked by that particular search engine.

24 Claims, 6 Drawing Sheets

FIG. 4

| On-Page Recommendations | Title (8) | Description (9) | Keywords (10) | Headings (38) | ALT (23) | First Words (200) | Body (474) | All Words (561) |
|---|---|---|---|---|---|---|---|---|
| Keyword Phrase 418 | 12.5% (1) | 11.1% (1) | 20.0% (2) | 2.6% (2) | 4.3% (1) | 2.5% (5) | 1.5% (7) | 1.8% (10) |
| Keyword 420 | 12.5% (1) | 11.1% (1) | 30.0% (3) | 7.9% (3) | 4.3% (1) | 5.0% (10) | 3.4% (16) | 4.5% (25) |
| Keyword Phase 422 | 25.0% (1) | 22.2% (1) | 40.0% (2) | 5.3% (1) | 8.7% (1) | 4.0% (4) | 2.1% (5) | 2.9% (8) |

SEARCH ENGINE PARAMETER OPTIMIZATION

BACKGROUND OF THE INVENTION

This disclosure relates generally to search engine parameter optimization and more specifically search engine parameter optimization systems and methods for optimizing digital content for improved search engine results.

The primary search result of many search engines is organic. No payment is involved in such organic searches as with paid ads. The percentage of online searches, online traffic and conversion events attributable to inorganic searches continues to significantly increase. Such organic search results are typically ranked based on what the search engine considers most relevant to users.

The content provided by many digital content owners are very relevant content. However, such content may not be highly ranked by a search engine. Even when the content includes site mapping, improved search parameter or keyword placement, back linking, etc., and other optimization factors, the content may not rank highly because of a lack of understanding of what is rewarded by a particular search engine algorithm. Improving organic search ranking remains a difficulty for search engines that must then rank hundreds of thousands highly relevant content; the understanding of factors rewarded by such search engines is a continuing technical challenge being addressed by software engineers and developers and SEO (search engine optimization) professionals.

Thus, there is a need to address one or more disadvantages of conventional systems and methods, and the present disclosure meets this need.

BRIEF SUMMARY OF THE INVENTION

Various aspects of a content search parameter optimization system and method can be found in exemplary embodiments of the present disclosure.

In one embodiment, a search parameter usage unit computes at least one search parameter metric for optimizing a new document for a web search query. The search parameter metric provides this search engine optimization at the time of content creation, that is, when the new document is created (or revised). Among other advantages, the search parameter metric is based on competing web content that is highly ranked by a particular search engine. In this manner, an improved understanding of search parameter factors that are rewarded by that particular search engine is attained.

In another embodiment, the search parameter usage unit computes at least one web search parameter metric that can adapt and optimize a new document for a web search query. Here, the web search query includes a search parameter that is associated with top-ranked web documents for a particular search engine. The web search parameter metric is then computed based on the search parameter.

The web search parameter metric might be computed by: 1) a search parameter acquisition unit that identifies and fetches the search parameter from a user input device, 2) a compiling unit that compiles multiple URLs (Uniform Resource Locators) that are returned upon submission of the web search query to a selected search engine, where each returned URL is associated with a highly-ranked web content, 3) a parser unit that fetches each the web content associated with each returned URL and parses each the web content, and 4) a user interface with a display menu that includes a display area showing the web search parameter metric. The search parameter usage unit utilizes the search parameter to perform a statistical analysis of the web content to determine the web search parameter metric.

A further understanding of the nature and advantages of the present disclosure herein may be realized by reference to the remaining portions of the specification and the attached drawings. Further features and advantages of the present disclosure as well as the structure and operation of various embodiments of the present disclosure are described in detail below with respect to the accompanying drawings. In the drawings, the same reference numbers indicate identical or functionally similar elements.

BRIEF DESCRIPTION OF THE DRAWINGS

FIG. 4 illustrates a user interface display menu for displaying search parameter metrics according to an exemplary embodiment of the present invention.

DETAILED DESCRIPTION OF THE INVENTION

Reference will now be made in detail to the embodiments of the disclosure, examples of which are illustrated in the accompanying drawings. While the disclosure will be described in conjunction with the one embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth to provide a thorough understanding of the present disclosure. However, it will be obvious to one of ordinary skill in the art that the present disclosure may be practiced without these specific details. In other instances, well-known methods, procedures, components, and circuits have not been described in detail as to not unnecessarily obscure aspects of the present disclosure.

Figure 1:
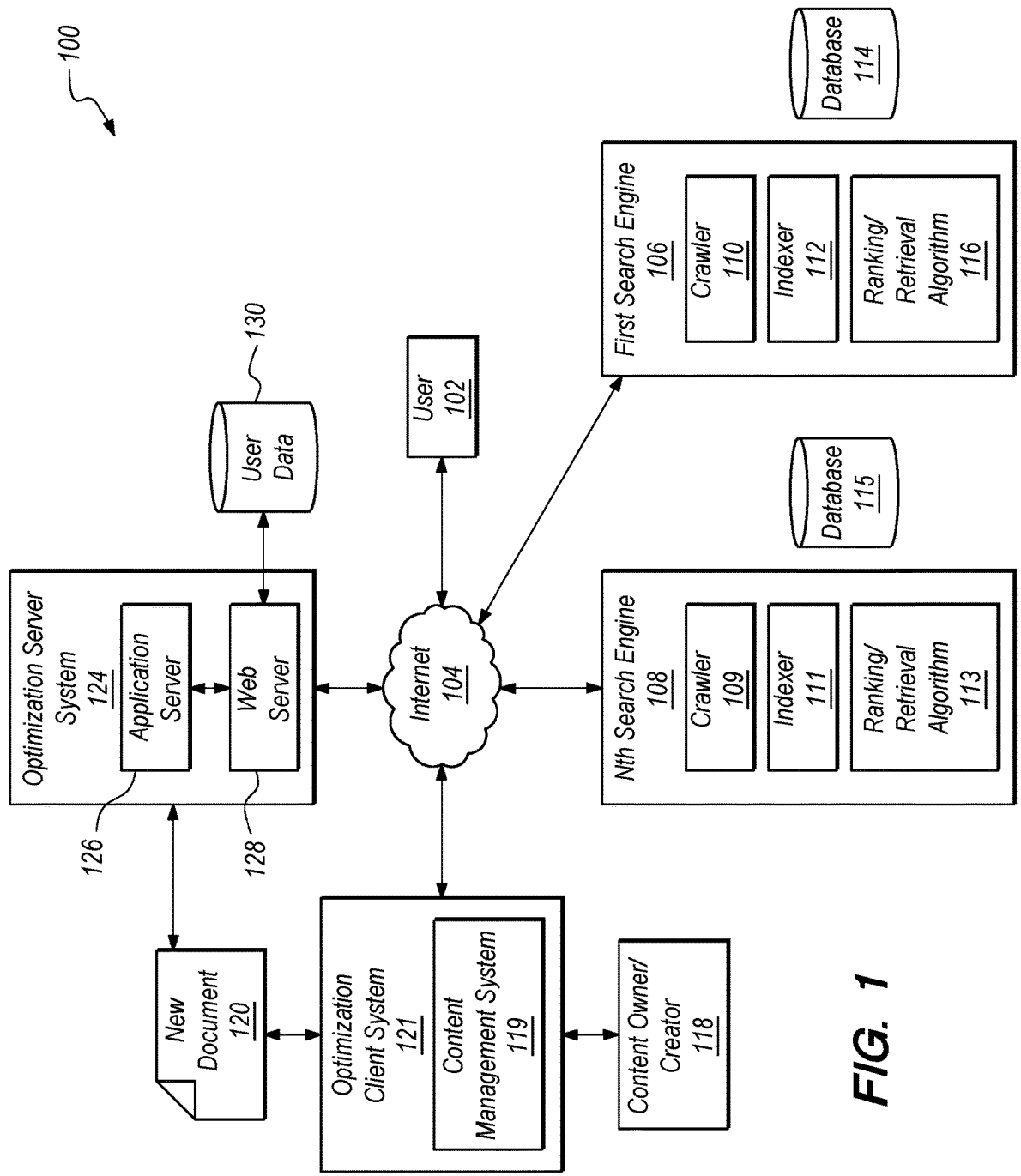
FIG. 1 illustrates SEO communication system according to an exemplary embodiment of the present disclosure.

FIG. 1 illustrates SEO communication system 100 according to an exemplary embodiment of the present disclosure.

In FIG. 1, SEO communication system 100 comprises user 102 communicably coupled via Internet 104 to a plurality of search engines including a first search engine 106 and an $N^{th}$ search engine 108. Internet 104 might be any communication system that allows point-to-point communication between two data points; Internet 104 might be wireless or wired. Although not shown, additional search engines beyond first search engine 106 and $N^{th}$ search engine 108 might be utilized.

Each one of first search engine 106 and $N^{th}$ search engine 108 can search for and retrieve information from Internet 104. Information retrieval is based on search parameters submitted to the search engines from users such as user 102.

Among other components, first search engine 106 includes crawler 110, indexer 112, database 114 and ranking/retrieval algorithm 116. Crawler 110 is adapted to initiate data acquisition about plural websites communicably coupled with Internet 104. Once data acquisition occurs, each website content becomes retrievable for display to clients such as user 102 where the displayed website correlates to the user's search query parameters.

Here, the data acquisition process of crawler 110 might include scanning each website to obtain a complete listing of web pages and the data contained therein. Acquired data might include images, page titles, keywords, and other pages linked to each web page. In other instances, data such as copies of entire web pages as well as page layouts might be cached in database 114.

In FIG. 1, as implied by its name, indexer 112 of first search engine 106 is adapted to parse all of the data gathered by crawler 110 for listing in database 114. The indexing process facilitates fast retrieval of data upon query by user 102. The architecture and functionality of indexer 112 might be based, without limitation, on inverted index, suffix tree or Ngram index for example. It is contemplated that other index architecture implementations can be employed.

As shown in FIG. 1, ranking/retrieval algorithm 116 of first search engine 106 can rank and display the documents of highest relevance that match the query by user 102. Here, ranking/retrieval algorithm 116 analyzes multiple factors to rank the pertinence and utility of web pages and to retrieve the most relevant search results. Ranking factors might include the number of quality links, keyword relevance and proximity, content age, metadata, prominence factors (bolding, headings, italics, lists, etc.)

In FIG. 1, $N^{th}$ search engine 108 includes components that are similar to the components of first search engine 106. Specifically, $N^{th}$ search engine 108 includes crawler 109, indexer 111, ranking/retrieval algorithm 113 and database 115 all of which are similar to the counterpart components of first search engine 106.

Referring now to FIG. 1, SEO communication system 100 further comprises a new document 120 that is communicably coupled to and retrievable by user 102. New document 120 is displayed when an inorganic search is performed by user 102 (on first search engine 106 for example). In particular, user 102 performs a relevant search on first search engine 106; which in turn retrieves new document 120.

Here, in accordance with principles and precepts of an embodiment of the present disclosure, an advantage is that the content of new document 120 is search-engine optimized by optimization client system 121. In other words, the optimization client system 121 solely or in conjunction with optimization server system 124 can augment new document 120 to yield a high ranking and increased-relevance web document when a web query based on a selected parameter or keyword phrase is submitted to a particular search engine as will be further described below with reference to FIG. 2 through FIG. 5 below. Such optimization might also be based on SaaS (Software as a Service) hosted by optimization server system 124, which includes application server 126, web server 128 and user data 130.

In one exemplary embodiment, among other components, optimization client system 121 may include content management system 119 for augmenting new document 120. Here, content management system 119 might be a website creation tool and the like. In one embodiment, content owner/creator 118 might employ a search parameter metric and content management system 119 to optimize new document 120. One of ordinary skill in the art will realize that other comparable configurations of SEO communication system 100 may be employed to implement the present disclosure.

Figure 2:
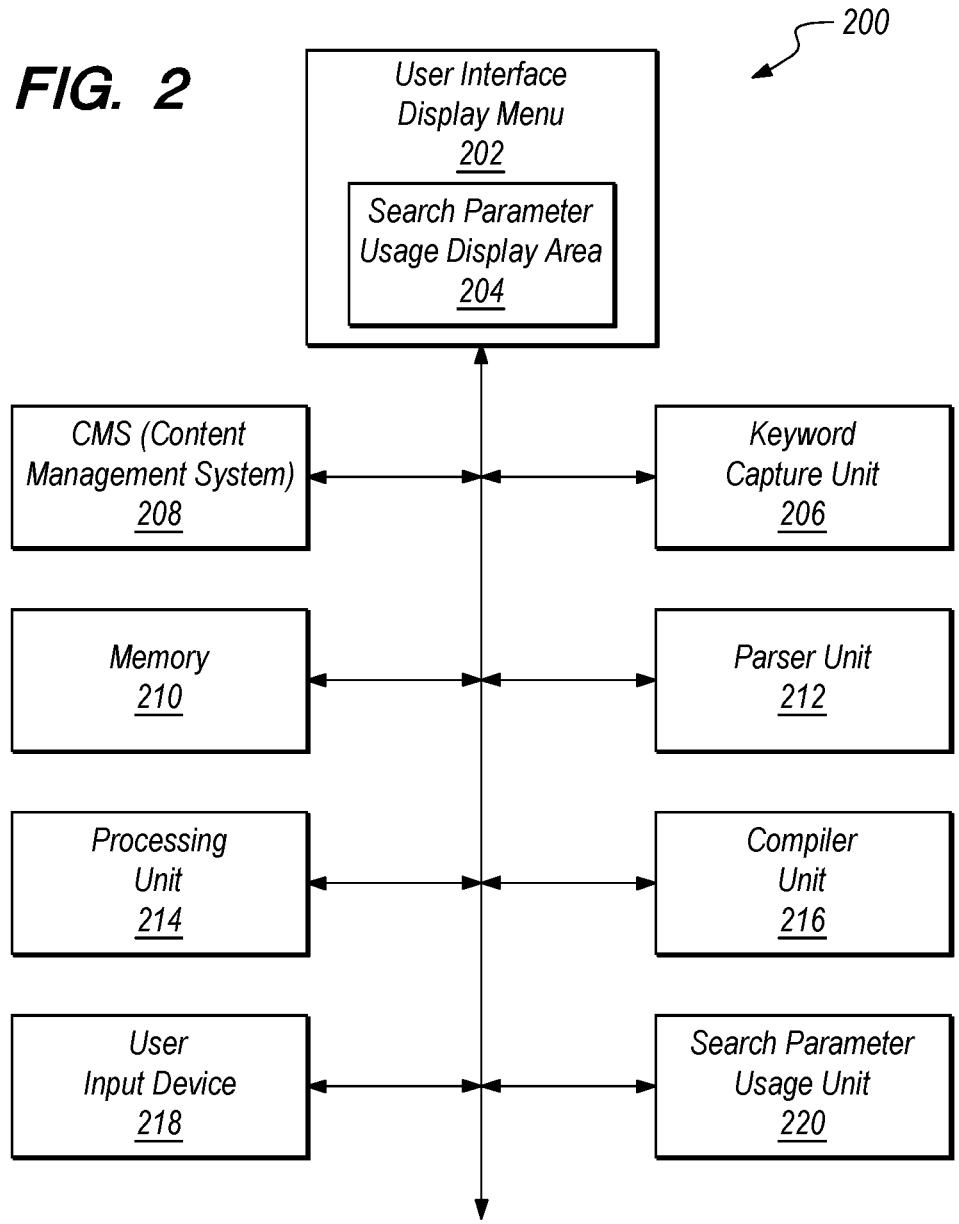
FIG. 2 illustrates an optimization client system according to an exemplary embodiment of the present disclosure.

FIG. 2 illustrates optimization client system 200 according to an exemplary embodiment of the present disclosure.

In FIG. 2, optimization client system 200 can be employed to enhance the ranking of web-searchable content for a selected search engine. As an example, content owner/creator 118 of FIG. 1 may employ optimization client system 200 to enhance the ranking of web-searchable content for first search engine 106 (FIG. 1). As another example, content owner/creator 118 can optimize web-searchable content for another search engine such as $N^{th}$ search engine 108 (FIG. 1). Here, an advantage is that an embodiment of the present disclosure automatically computes metrics that might be rewarded by the selected search engine for a selected search parameter (such as a keyword phrase).

The web-searchable content for optimization might be new document 120 of FIG. 1. And new document 120 may be optimized for the selected search parameter. Thus, when user 102 (FIG. 1) submits a query based on the selected search parameter, the returned search query results would include optimized new document 120 with a first page ranking that is significantly higher relative to conventional systems. As used herein, a search parameter might be a keyword phrase, keyword and the like. One skilled in the art will realize that other comparable search parameters can be utilized.

The selected keyword phrase or keyword is utilized to generate web search parameter metrics for use with new document 120. An objective might simply be to optimize keyword phrase frequency within a particular HTML (Hypertext Markup Language) block, all based on statistical analysis of competing web content corresponding to the keyword phrase.

This document optimization not only facilitates planning for content creation, it improves memory function because irrelevant search optimization content is excluded at content creation; document optimization also significantly improves traffic for any website (for example) with optimized new documents. Another advantage is that search parameter metrics and content creation are on the same platform thus providing a productivity boost for content creators because content creators do not have to switch between platforms.

As shown in FIG. 2, among other components, optimization client system 200 may include processor 214 as well as memory 210. In one embodiment, processor 214 and memory 210 may be adapted to execute a sequence of stored instructions including parsing and indexing operations of selected new documents. Optimization client system 200 further includes user interface display menu 202 which might include area 204 for displaying search parameter metrics.

In FIG. 2, optimization client system 200 also includes keyword capture unit 206 and CMS (content management system) 208 and parser unit 212 for creating and revising digital content. Such digital content might include blog and web page content including text, audio and video, embedded graphics and photos, etc. Although not shown, CMS 208 might include a user interface that allows addition and revision of content by users with web master content intervention and a content delivery unit for acquiring information and updating a website. In one embodiment, an example of CMS 208 might be WORDPRESS™.

Keyword capture unit 206 fetches a keyword phrase from a form input; the keyword phrase may comprise a search query for submission by user 102. Keyword capture unit 206 recognizes and classifies the language of the keyword. Since many search engines are adapted to retrieve documents in different languages, the particular keyword can be in any language. The keyword phrase "ottimizzazione del motore di ricerca" would be recognized as Italian for "search engine optimization."

Keyword capture unit 206 might also tokenize a received keyword phrase into its constituent individual phrases or keywords. The keyword phrase "search engine optimization" would be tokenized into sub-phrases "search engine" and "engine optimization" for example. As another example, the keyword phrase "patent application" might be tokenized into two individual keywords: "patent" and "application." By tokenizing the keyword phrase, the present disclosure presents highly precise web search parameter metrics that can enhance the ranking of a new document because a search parameter metric is based not only on keyword phrases entered but is also based on individual constituents of keyword phrases.

The following is a high level pseudo-code of an example of an implementation of keyword phrase capture unit 206:

```
keyword_phrase = forms.data["Keyword"];
language = LanguageDetector( ).map_language(keyword_phrase);
words = WordTokenizer(language, keyword).
```

Referring now to FIG. 2, optimization client system 200 also includes parser unit 212 and compiler unit 216 that compiles automatically and without user interference the URLs that are returned when user 102 submits a search query with a relevant keyword phrase. This is another advantage of the present disclosure. New features take significantly less time to operate because the embodiment of the present disclosure is automatic and does not require manual input of URLs.

The search query from user 102 is submitted to a specific search engine, here, first search engine 106. Each returned URL is associated with web content such as a web page. Upon receipt of the URLs, in one embodiment, compiler unit 216 ranks all of the search results.

It is noted that user 102 might indicate that only URLs with a first page ranking be returned. This search indication might be via the user interface display menu 202. The following is a high level pseudo-code of an example of an implementation of compiler 216 unit:

```
search_results = search(keyword_phrase);
rankings = { };
rank = 1;
for result in search_results {
    rankings[result.url] = rank;
    rank = rank + 1;
    }
```

In FIG. 2, parser unit 212 can download each new document associated with each returned URL and parse the tag structured document. Specifically, parser unit 212 downloads the page source and parses it from HTML into an XML (Extended Markup Language) tree. Advantageously, this significantly reduces the memory footprint and makes the speed of searching much faster. Each HTML is parsed based on tags including but not limited to a title tag, header tag, body tag, meta tag that provide elements to specify description, keywords, etc.

In FIG. 2, optimization client system 200 further comprises user input device 218 and search parameter usage unit 220 that uses processor 210 to compute web search parameter metrics for each selected search parameter or keyword phrase. Search parameter metrics are computed based on each tag and HTML block and on the search parameter phrase and subphrase/keyword. Web search parameter metrics can optimize new document 120 and improve its ranking for a web search query that is entered by user 102. As previously noted and as will be further discussed, the web search parameter metrics are based on the search parameter. Search parameter usage unit 220 might utilize the search parameter to perform a statistical analysis (using regression, standard deviation, mean, etc.) of content to determine web search parameter metrics. A pseudo-code for implementing the above-referenced functionality might be as follows.

```
for url in rankings.keys( ) {
    data = fetch(url);
    html = htmlparser.parse(data);
    title = html.xpath("//title/text( )");
    title_words = WordTokenizer(language, title);
    number_title_words = title_words.length( ).
```

Figure 3:
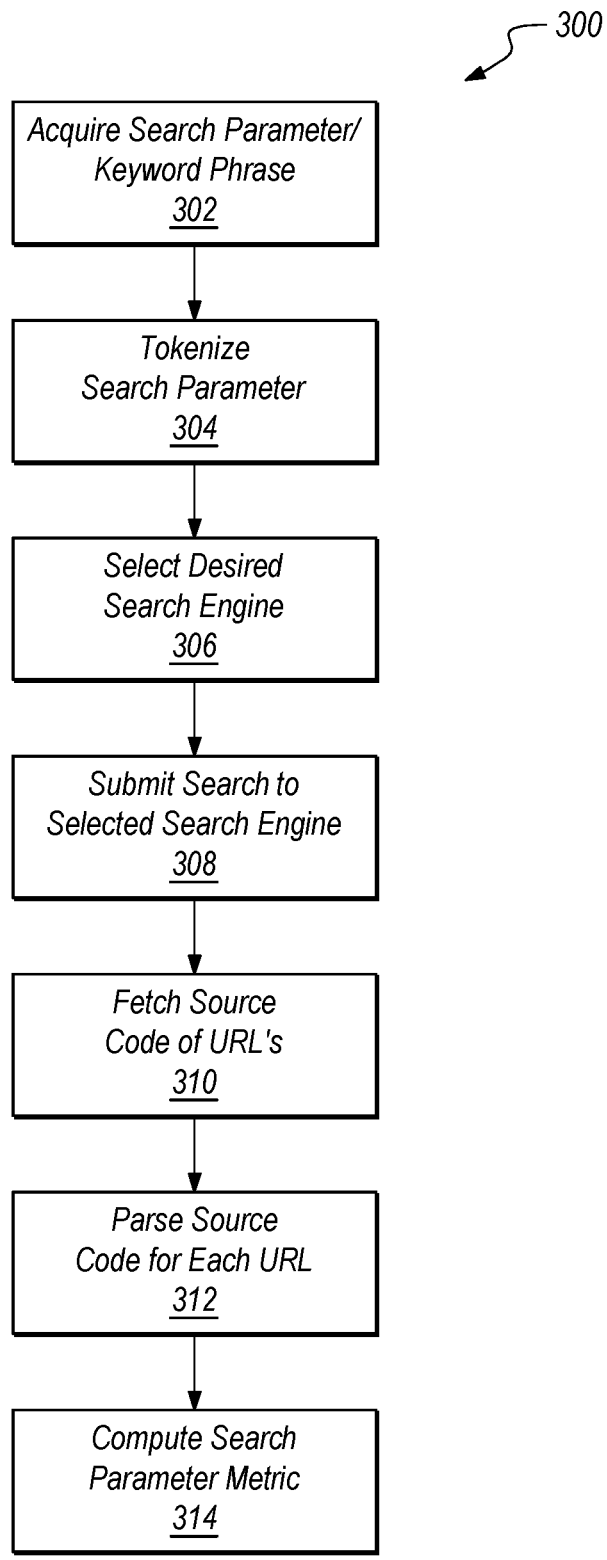
FIG. 3 illustrates a content optimization method according to an exemplary embodiment of the present invention.

FIG. 3 illustrates optimization client method 300 according to an exemplary embodiment of the present disclosure.

At block 302 (acquire search parameter/keyword phrase), optimization client method 300 is initiated by acquiring a search parameter. This search parameter might 20 be a keyword phrase or keyword that is included in top-ranked competing web content. In one embodiment, the keyword phrase is provided by content owner/creator 118 of FIG. 1. In an alternate embodiment, the keyword phrase is automatically derived as discussed subsequently in the third paragraph below.

Content owner/creator 118 might be a website owner, blog owner, social media site, service provider, content editor, commercial enterprise website, etc., or any person or entity that has or operates a website, web blog and the like that is retrievable via the Internet and that wishes to increase the page ranking of their content. Here, content owner/creator 118 might be responsible for or is the content creator for new document 120 (FIG. 1) intended for a website, blog, etc.

Content owner/creator 118 provides a search parameter keyword phrase applicable to the new document 120. For example, if new document 120 relates to services for optimizing search engine rankings, the keyword phrase provided by content owner/creator 118 might be "search engine optimization." This keyword phrase is then captured or acquired by keyword capture unit 206 of FIG. 2.

In another embodiment, keyword phrases can be acquired by analyzing current web content. Here, contiguous sequences of words are extracted from the text and counted with the most used sequences becoming keyword phrases for the web content.

At block 304, (tokenize search parameter) method 300 determines whether the search parameter comprises a phrase with more than one word. If so, method 300 involves tokenizing the acquired search parameter into individual keywords. If the search parameter comprises a keyword phrase with two words, then this step may yield two individual keywords and the keyword phrase. If the search parameter comprises three or more words, method 300 may tokenize the search parameter into multiple individual keywords and/or sub-phrases. For each individual keyword, phrase and sub-phrase, the content for each URL is parsed as discussed at block 314 below.

At block 306 (select desired search engine), a desired search engine is selected. The particular search engine selected is based on the user's preference. Here, any one of first search engine 106 through N$^{th}$ search engine 108 may be selected. In a further embodiment, a plurality of search engines may be selected where the search parameter metric is based on all of the search engines.

At block 308 (submit search to selected search engine), a query based on the search parameter is submitted to the selected search engine for web documents that are relevant to the search parameter. A search for "search engine optimization" would display the URL for competing documents for search engine optimization, for example:

> https://www.bruceclay.com/seo/search-engine-optimization.htm
> https://www.webopedia.com/TERM/S/SEO.html
> https://blog.kissmetrics.com/simple-guide-to-seo/.

The return URLs are associated with top-ranked documents since the query is based on the search parameter that is included in top-ranked documents. In this manner, the characteristics of such top-ranked documents can be analyzed. In one embodiment, the displayed URLs may be limited to first-page-ranked documents depending upon user settings. In another embodiment, the retrieved documents are limited to the top ten results returned by the search engine.

At block 310 (fetch source code of URLs), optimization client method 300 involves fetching the source code for each of the retrieved URLs.

At block 312 (parse source code for each URL), optimization client method 300 parses the source code for each URL. Each section might be structurally defined by an HTML tag. This parsing step might be implemented by parser unit 212 as discussed with reference to FIG. 2.

At block 314 (compute search parameter metric), search parameter usage unit 220 computes usage metrics for the search parameters acquired at block 302. Here, content owner/creator 118 can utilize the computed metrics referenced below to optimize new document 120.

FIG. 4 illustrates a user interface display menu 400 first according to an exemplary embodiment of the present invention.

In FIG. 4, user interface display menu 400 displays computed search parameter metrics that are based on a selected search parameter and web page content retrieved for that search parameter. As previously noted, the selected search parameter is one that is associated with web content that are highly ranked by the search engine. Here, user interface display menu 400 might be displayed to content owner/creator 118 (FIG. 1) for example. Content owner/creator 118 may then adapt new document 120 (FIG. 1) to optimize search results for a selected search engine.

As shown, user interface display menu 400 is tabular with a number of column and rows. The column areas represent tags within the web content, the tags including title 402, description 404, keywords 406, headings 408, ALT 410, first words 412, body 414 and all words 416. Each tag 402, 404, 406, 408, 410, 412, 414, 416 represents search parameter metric information for the respective section of the web content. For example, title 402 represents the Title tag and provides search metrics for the Title tag block of the web content. As another example, headings 408 represents the Headings tag and provides metrics for the headings block of the web page content.

The row areas of user interface display menu 400 represent the search parameter phrases and keywords wherein keyword phrase 422 represents the keyword phrase of the search parameter, phrase 418 represents a sub-phrase of the keyword phrase 422 while keyword 420 represents an individual keyword of keyword phrase 422.

The intersection of the keywords (rows) and tags (columns) is shown as a plurality of fields 424 for displaying the computed search parameter metrics for each search parameter. Fields 424 show the percentage of keyword (or keyword phrase) usage relative to the total word count in each tag. For example, field 426 shows the percentage 12.5% (shown as 431). Hence, the phrase (418) is 12.5% of the total word count in the Title tag block (which is then implemented in new document 120). The raw count 430 is also shown as 1. Therefore, the phrase (418) is one word of the total word count in the Title tag block. The total word count 428 of all words for each tag is shown in parentheses in each column header.

Figure 5:
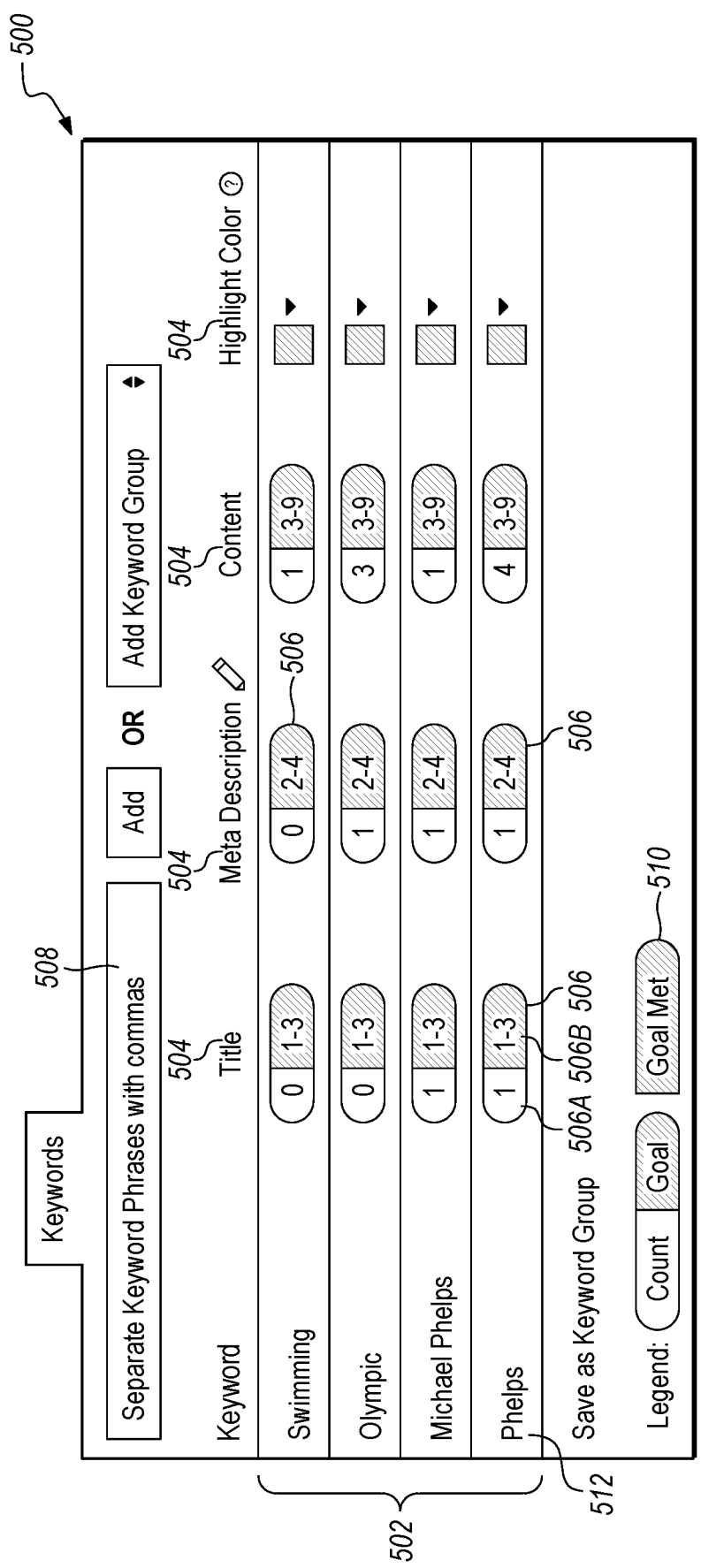
FIG. 5 illustrates a user interface display menu for displaying search parameter metrics according to an exemplary embodiment of the present invention.

FIG. 5 illustrates a user interface display menu 500 that is an alternate embodiment of the user interface display menu 400 of FIG. 4.

Here, user interface display menu includes keywords 502 that are shown as rows and various tags 504 including title, meta description, content and highlight color are shown as columns. Fields 506 show the current count of the keyword for a tag and the usage goal range. As an example, 506A shows that the current count for keyword Phelps (512) in the Title is 1; while 506B shows that the usage goal range is 1-3 keywords. User interface display menu 500 further includes a goal met display 510 that can indicate whether the search parameter goal metric for web documents has been met. An advantage of user interface display menu 500 is that it includes keyword field 508 for adding selected search parameters such as keyword phrases, where multiple keyword phrases can be entered, separated with commas.

Examples of Implementations

The system might include a search parameter usage unit that determines at least one web search parameter metric that can adapt and optimize a new document for a web search query. The web search query includes a search parameter that is associated with top ranked web documents. The web search parameter metric is computed based on this search parameter that is associated with top-ranked documents. The web search parameter might be computed by 1) a search parameter acquisition unit that identifies and fetches the search parameter from a user input device; 2) a compiling unit that compiles multiple URLs (Uniform Resource Locators) that are returned upon on submission of the web search query to a selected search engine, each returned URL is associated with a new document (top ranked); 3) a parser unit that fetches each new document associated with each returned URL, and parses each of the new documents and its content; and 4) a user interface with a display menu that includes a display area showing the web search parameter metric. The search parameter usage unit utilizes the search parameter to perform a statistical analysis of content of each retrieved new document to determine the least one web search parameter metric.

The search parameter may be a keyword phrase. The search parameter acquisition unit may tokenize the keyword phrase into individual keywords or subphrases. The at least one web search parameter metric may be computed based on the keyword phrase. The keyword phrase might comprise two or more keywords including a first keyword and a second keyword. The first web search parameter metric is computed based on the first keyword and the second web search parameter metric is computed based on the second keyword of the keyword phrase. Each new document is structured into at least a first section and a second section.

The first web search parameter metric is computed based on the first section of the new document; and a second web search parameter metric is computed based on the second section of the new document. The first section might be defined by a title tag and the second section may be defined by a body tag. The first web search parameter metric may be computed based on both the keyword phrase and the first section of the new document, and the second web search parameter metric is computed based on both the keyword phrase and the second section of the new document.

The at least one web search parameter metric is based on an average of the search parameter metric for each of the new documents associated with the URLs. If two new documents yield a keyword phrase percentage of 30% and 40% for the title tag, for example, then the search parameter metric is 35%. The web search parameter metric displayed on the display menu is displayed for a keyword phrase for adapting a section of the web document. The display menu further includes multiple display areas, each displaying a web search parameter metric for each respective section of the web document. The display menu may also include multiple display areas, each displaying a web search parameter metric for a keyword phrase and each respective section of the web document.

The display menu further may further include plural display areas, each area displaying a web search parameter metric for a keyword of a keyword phrase and for a section of the web document. The display menu may further include first display areas, each display area displaying a web search parameter metric for a keyword phrase and for a section of the web document; and second display areas, each display area displaying a web search parameter metric for a keyword of the keyword phrase and for each of said section of the web document.

In another embodiment, the system of the present disclosure may analyze rewarded website pages specific to a search parameter to make learned recommendations specific to the current ranking parameters. The system uses rules derived from a results list to derive differing parameters for each keyword or search parameter. The system dynamically alters the search parameter metric over time as the search results change. The system can adapt to the search parameter operating environment to better understand and guide content creators.

In another embodiment, a computer program product including a non-transitory computer readable storage medium having executable code, the code when executed by a processor performing the following: computing, at least one web search parameter metric, the web search parameter metric being applied to a web document and optimizing the web document for a web search query having a search parameter, the at least one web search parameter metric being based on the search parameter.

The code when executed by the processor also fetching the search parameter from a user input device; compiling and ranking multiple Uniform Resource Locators (URLs) that are returned upon on submission of the web search query and search parameter to a selected search engine, each returned URL being associated with a new document; parsing, after fetching, each new document associated with each returned URL, and parses each one of said new documents and its content; and displaying a display menu having at least one display area displaying the at least one web search parameter metric, wherein said search parameter usage unit utilizes the search parameter to perform a statistical analysis of content of each retrieved new document to determine the least one web search parameter metric.

In a further embodiment, a method includes performing by using one or more processors associated with one or more computing devices, a statistical analysis to yield a web search parameter metric, the web search parameter metric optimizing a web document for a web search query with a search parameter, wherein said web search parameter metric is based on the search parameter; upon entry by a user on a user input device, The method further including fetching using one or more processors associated with one or more computing devices said search parameter; compiling and ranking multiple Uniform Resource Locators (URLs) that are returned upon on submission of the web search query and search parameter to a selected search engine, each returned URL being associated with a new document; parsing contents of each new document associated with each returned URL; and generating a display menu having at least one display area displaying the at least one web search parameter metric, wherein said search parameter is utilized to perform said statistical analysis of content of each retrieved new document to determine the least one web search parameter metric.

Figure 6:
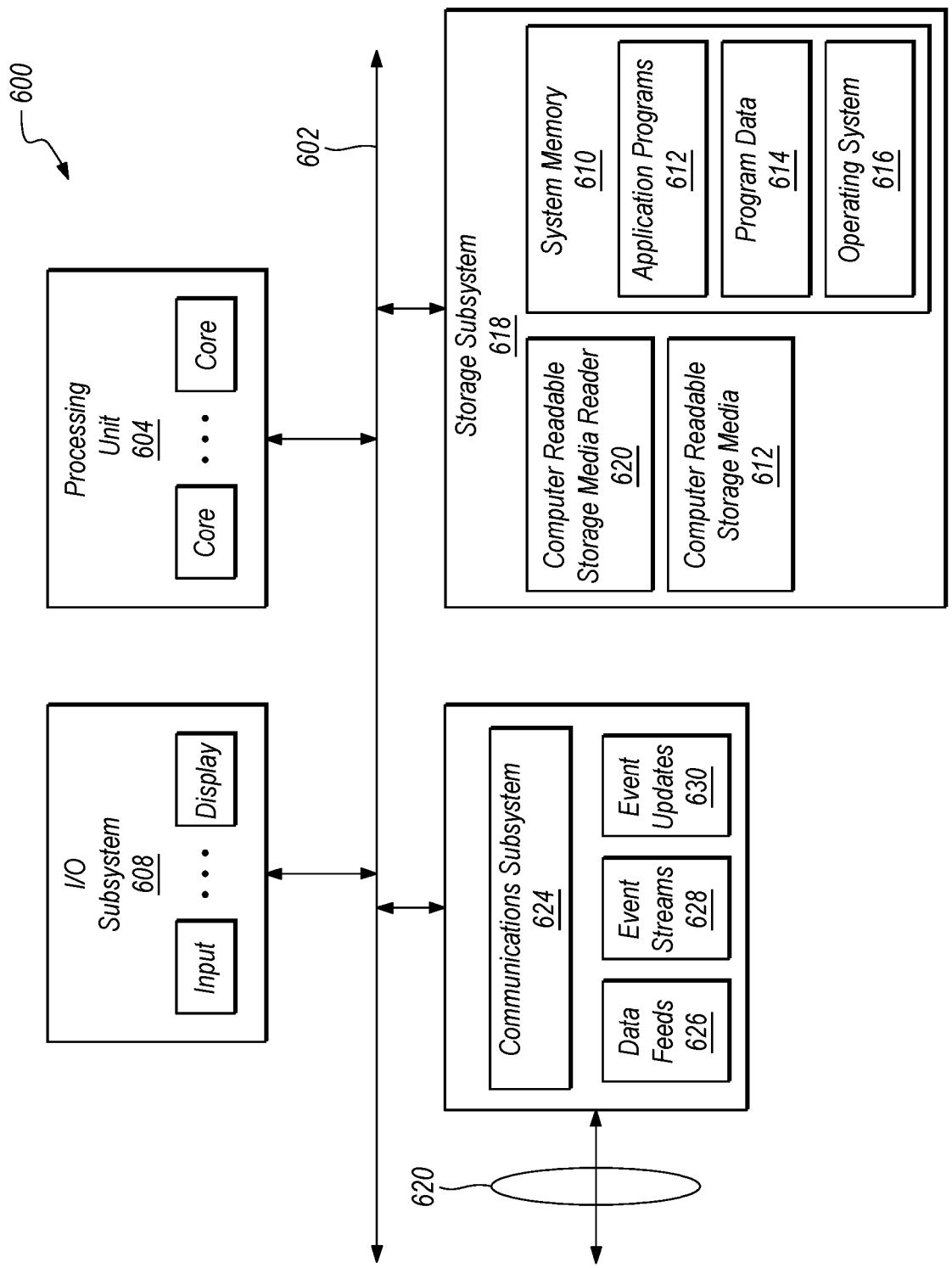
FIG. 6 is a block diagram that illustrates a specially-purposed computer system for implementing an embodiment of the present invention.

The presently described techniques are implementable by one or more special-purpose computing devices. The special-purpose computing devices might be hard-wired to implement such techniques. Alternatively, the special-purpose computing devices might be ASICs (Application-Specific Integrated Circuits) SoC (Systems on a Chip) or FPGA (Field Programmable Gate Arrays) that are (FPGAs) that can be adapted or programmed to implement digital functions to implement the techniques, or may include one or more general purpose hardware processors specially purposed for a specific functionality programmed to perform the techniques according to specific program instructions in firmware, memory, other storage, or a combination. Such special-purpose computing devices may also combine custom hard-wired logic, ASICs, or FPGAs with custom programming to accomplish the techniques. For example, FIG. 6 is a block diagram that illustrates a specially-purposed computer system 600 for implementing an embodiment of the present invention. Computer system 600 might be used to implement any of the computer systems described above.

As shown in the figure, computer system 600 includes a processing unit 604 communicating with various peripheral subsystems via bus 602. Such peripheral subsystems may include but are not limited to I/O subsystem 608, storage subsystem 618, and communications subsystem 624. Storage subsystem 618 includes computer-readable storage media 612 and system memory 610. Computer system 600 may implement the techniques described herein using customized hard-wired logic, one or more ASICs or FPGAs, firmware and/or program logic which in combination with the computer system causes or programs computer system 600 to be a special-purpose machine. Bus 602 permits communication between components and components of computer system 600. Bus 602 might be a memory bus or memory controller, a peripheral bus, and a local bus with bus architectures such as Industry Standard Architecture (ISA) bus, Micro Channel Architecture (MCA) bus, Enhanced ISA (EISA) bus, Video Electronics Standards Association (VESA) local bus, and Peripheral Component Interconnect (PCI). One or more single core or multicore processors may be included in processing unit 604.

In various embodiments, processing unit 604 executes programs responsive to program code or instructions and can maintain multiple concurrently executing programs or processes. All or some program code can be executed resident in processing unit 604 and/or in storage subsystem 618. Through suitable special-purpose programming, processing unit 604 can provide various functionalities described above.

I/O subsystem 608 may include user interface input devices and user interface output devices. User interface input devices may include a keyboard, pointing devices such as a mouse, a touchpad, a scroll wheel, a click wheel, a dial, a button, a switch, a keypad, audio input devices with voice command recognition systems, microphones, and other types of input devices. User interface input devices may include, for example, motion sensing and/or gesture recognition devices that enables users to control and interact with an input device, through word commands or gestures. User interface input devices may also include eye gesture recognition devices, and voice recognition, three dimensional mice, joysticks, gamepads, and audio/visual devices such as speakers, digital cameras, digital camcorders, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, medical ultrasonography devices. User interface input devices may also include, for example, audio input devices such as MIDI keyboards, digital musical instruments and the like. User interface output devices may include a display subunit, indicator lights, or non-visual displays such as audio output devices, etc.

The display subunit might be a cathode ray tube (CRT), a flat-panel device, such as that using a liquid crystal display (LCD) or plasma display, a projection device, a touch screen, and the like. In general, use of the term "output device" is intended to include all possible types of devices and mechanisms for outputting information from computer system 600 to a user or other computer. For example, user interface output devices may include, without limitation, a variety of display devices that visually convey text, graphics and audio/video information such as monitors, printers, speakers, headphones, automotive navigation systems, plotters, voice output devices, and modems.

Computer system 600 may include storage subsystem 618 that comprises software elements, shown as being currently located within a system memory 610. System memory 610 may store program instructions that are loadable and executable on processing unit 604, as well as data generated during the execution of these programs. Depending on the configuration and type of computer system 600, system memory 610 might be volatile (such as random access memory (RAM)) and/or non-volatile (such as read-only memory (ROM), flash memory, etc.) The RAM typically contains data and/or program modules that are immediately accessible to and/or presently being operated and executed by processing unit 604. In some implementations, system memory 610 may include multiple different types of memory, such as static random access memory (SRAM) or dynamic random access memory (DRAM). In some implementations, a basic input/output system (BIOS), containing the basic routines that help to transfer information between elements within computer system 600, such as during start-up, may typically be stored in the ROM. By way of example, and not limitation, system memory 610 also illustrates application programs 612, which may include client applications, Web browsers, mid-tier applications, relational database management systems (RDBMS), etc., program data 1114, and an operating system 1116. Operating system 616 may include Apple Macintosh®, Microsoft® and/or Linux® operating systems. Storage subsystem 618 may also provide a tangible computer-readable storage medium for storing the basic programming and data constructs that provide the functionality of some embodiments. Software (programs, code modules, instructions) that when executed by a processor provide the functionality described above might be stored in storage subsystem 618. These software modules or instructions might be executed by processing unit 604.

Storage subsystem 618 may also provide a repository for storing data used in accordance with the present invention. Storage subsystem 618 may also include a computer-readable storage media reader 620 that can further be connected to computer-readable storage media 612. Together and, optionally, in combination with system memory 610, computer-readable storage media 612 may comprehensively represent remote, local, fixed, and/or removable storage devices plus storage media for temporarily and/or more permanently containing, storing, transmitting, and retrieving computer-readable information.

Computer-readable storage media 612 containing code, or portions of code, can also include any appropriate media known or used in the art, including storage media and communication media, such as but not limited to, volatile and non-volatile, removable and non-removable media implemented in any method or technology for storage and/or transmission of information. This can include tangible computer-readable storage media such as RAM, ROM, electronically erasable programmable ROM (EEPROM), flash memory or other memory technology, CD-ROM, digital versatile disk (DVD), or other optical storage, magnetic cassettes, magnetic tape, magnetic disk storage or other magnetic storage devices, or other tangible computer readable media. This can also include nontangible computer-readable media, such as data signals, data transmissions, or any other medium which can be used to transmit the desired information and which can be accessed by computing system 600. For example, computer-readable storage media 612 may include a hard disk drive that reads from or writes to non-removable, nonvolatile magnetic media, a magnetic disk drive that reads from or writes to a removable, non-volatile magnetic disk, and an optical disk drive that reads from or writes to a removable, nonvolatile optical disk, etc. Computer-readable storage media 612 may include, but is not limited to, flash memory cards, flash drives, universal serial bus flash drives, secure digital cards, DVD disks, digital video tape, and the like. Computer-readable storage media 612 may also include, solid-state drives based on non-volatile memory such as flash-memory based SSDs, enterprise flash drives, solid state ROM, and the like, SSDs based on volatile memory such as solid state RAM, dynamic RAM, static RAM, DRAM-based SSDs, magneto-resistive RAM (MRAM) SSDs, and hybrid SSDs that use a combination of DRAM and flash memory based SSDs. The disk drives and their associated computer-readable media may provide non-volatile storage of computer-readable instructions, data structures, program modules, and other data for computer system 600.

Communications subsystem 624 provides an interface to other computer systems and networks. Communications subsystem 624 serves as an interface for receiving data from and transmitting data to other systems from computer system 600. For example, communications subsystem 624 may enable computer system 600 to connect to one or more devices via the Internet. In some embodiments communications subsystem 624 can include radio frequency transceiver components for accessing wireless voice and/or data networks (e.g., using cellular telephone technology, advanced data network technology, such as EDGE (enhanced data rates for global evolution), WiFi (IEEE 802.11 family standards, or other mobile communication technologies, or any combination thereof), global positioning system (GPS) receiver components, and/or other components.

In some embodiments communications subsystem 624 can provide wired network connectivity (e.g., Ethernet) in addition to or instead of a wireless interface. In some embodiments, communications subsystem 624 may also receive input communication in the form of structured and/or unstructured data feeds 626, event streams 628, event updates 630, and the like on behalf of one or more users who may use computer system 600. For example, communications subsystem 624 might be adapted to receive data feeds 626 in real-time from users of social networks and/or other communication services updates, web feeds such as Rich Site Summary (RSS) feeds, and/or real-time updates from one or more third party information sources. Additionally, communications subsystem 624 may also be adapted to receive data in the form of continuous data streams, which may include event streams 628 of real-time events and/or event updates 630, that might be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 624 might be adapted to output the structured and/or unstructured data feeds 626, event streams 628, event updates 630, and the like to one or more databases that might be in communication with one or more streaming data source computers coupled to computer system 600. Storage media is distinct from but may be used in conjunction with transmission media. Transmission media participates in transferring information between storage media. For example, transmission media includes coaxial cables, copper wire and fiber optics, including the wires that comprise bus 602.

Transmission media can also take the form of acoustic or light waves, such as those generated during radio-wave and infra-red data communications. Various forms of media may be involved in carrying one or more sequences of one or more instructions to processing unit 604 for execution. For example, the instructions may initially be carried on a magnetic disk or solid state drive of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 1102. Bus 1102 carries the data to system memory 610, from which processing unit 604 retrieves and executes the instructions.

Communications subunit 1108 also provides a two-way data communication coupling to a network link 620 that is connected to a local network. For example, network link 620 may be an integrated services digital network (ISDN) card, cable modem, satellite modem, or a modem to provide a data communication connection to a corresponding type of telephone line. As another example, network link 620 may be a local area network (LAN) card to provide a data communication connection to a compatible LAN. Wireless links may also be implemented. Network link 620 typically provides data communication through one or more networks to other data devices. For example, network link 620 may provide a connection through local network to a host another computer or data equipment operated by an Internet Service Provider (ISP), which in turn provides data communication services through the Internet. The signals through the various networks and the signals on network link 620 are example forms of transmission media. Computer system 600 can send messages and receive data, including program code, through the network(s), network link 620. Computer system 600 may be communicably coupled to a web server and application server that provides access control services in cooperation with a data store, and is able to generate content such as text, graphics, audio, and/or video to be transferred to the user, which may be serviced to the user by the Web server in form of HTML, DHTML, XML or another appropriate structured language in the example. The handling of all requests and responses, as well as the delivery of content between a client device and a resource, can be handled by the Web server. It should be understood that the Web and application servers are not required and are merely example components, as structured code discussed herein can be executed on any appropriate device or host machine as discussed elsewhere herein.

Various aspects can be implemented as part of at least one service or Web service including SaaS or PaaS. Services such as Web services can communicate using any appropriate type of messaging, such as by using messages in Extensible Markup Language (XML) format and exchanged using an appropriate protocol such as SOAP (derived from the "Simple Object Access Protocol"). Processes provided or executed by such services can be written in any appropriate language such as the Web Services Description Language (WSDL). Using a language such as WSDL allows for functionality such as the automated generation of client-side code in various SOAP frameworks. Server(s) may be capable of executing programs or scripts in response requests from user devices, such as by executing one or more scripts or programs written in any programming language, such as JAVA or C++, or any scripting language, such as Perl or Python or combinations thereof. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. In the description herein, numerous specific details are provided, such as examples of components and/or methods, to provide a thorough understanding of particular embodiments.

One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope. Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above. Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an" and "the" includes plural references unless the context clearly dictates otherwise. Also, as used in the description herein and throughout the claims that follow, the meaning of "in" includes "in" and "on" unless the context clearly dictates otherwise.

While the above is a complete description of exemplary specific embodiments of the disclosure, additional embodiments are also possible. Thus, the above description should not be taken as limiting the scope of the disclosure, which is defined by the appended claims along with their full scope of equivalents.

I claim:

1. A system comprising:
a search parameter usage unit that determines, by using one or more processors associated with one or more computing devices, to compute at least one web search parameter metric, the web search parameter metric adapting a new web document and optimizing said new web document for a web search query having a search parameter, the web search parameter metric being computed based on top-ranked web pages returned by the search parameter, and wherein said one web search parameter metric is computed by:
a search parameter acquisition unit that identifies and fetches the search parameter from a user input device;
a compiling unit that compiles, without user interference, multiple Uniform Resource Locators (URLs) that are returned upon submission of the web search query and search parameter to a selected search engine with each returned URL being associated with highly-ranked web content;
a parser unit that upon fetching the highly-ranked web content associated with each returned URL parses each one of said highly-ranked web content as a plurality of tag structures with information associated therewith;
a user interface displaying a display menu having at least one display area displaying the at least one web search parameter metric;
wherein said search parameter usage unit utilizes the search parameter to perform a statistical analysis of information in each of the tag structures to determine the at least one web search parameter metric.

2. The system of claim 1 wherein said search parameter is a keyword phrase, wherein said search parameter acquisition unit tokenizes the keyword phrase into individual keywords or subphrases.

3. The system of claim 1 wherein said search parameter is a keyword phrase, and wherein said at least one web search parameter metric is computed based on said keyword phrase.

4. The system of claim 3 wherein said keyword phrase comprises two keywords including a first keyword and a second keyword,
wherein a first web search parameter metric is computed based on the first keyword of said keyword phrase,
and wherein a second web search parameter metric is computed based on the second keyword of said keyword phrase.

5. The system of claim 1 wherein the highly-ranked web content is a new document is structured into at least a first section and a second section,
wherein a first web search parameter metric is computed based on the first section of the new document;
and wherein a second web search parameter metric is computed based on the second section of the new document.

6. The system of claim 5 wherein the first section is defined by a title tag and the second section is defined by a body tag.

7. The system of claim 1 wherein said search parameter is a keyword phrase and wherein the highly-ranked web content is a new document structured into at least a first section and a second section,
wherein a first web search parameter metric is computed based on both the keyword phrase and the first section of the new document;
and wherein a second web search parameter metric is computed based on both the keyword phrase and the second section of the new document.

8. The system of claim 1 wherein said at least one web search parameter metric is based on an average of the search parameter metric for each one of new documents associated with the URLs.

9. The system of claim 1 wherein the web search parameter metric displayed on the display menu is displayed for a keyword phrase for adapting a section of the new web document.

10. The system of claim 1 wherein said display menu further comprises a plurality of display areas, each displaying a web search parameter metric for each respective section of the new web document.

11. The system of claim 1 wherein said display menu further comprises a plurality of display areas, each area displaying a web search parameter metric for a keyword phrase and each respective section of the new web document.

12. The system of claim 1 wherein said display menu further comprises a plurality of display areas each area displaying a web search parameter metric for a keyword of a keyword phrase and for a section of the new web document.

13. The system of claim 1 wherein said display menu further comprises a first plurality of display areas, each display area displaying a web search parameter metric for a keyword phrase and for a section of the new web document; and
 a second plurality of display areas each display area displaying a web search parameter metric for a keyword of the keyword phrase and for each of said sections of the new web document.

14. The system of claim 1 wherein the parser unit upon fetching the highly-ranked web content associated with each returned URL parses each one of said content by conversion of said content from Hypertext Markup Language to an Extensible Markup Language tree.

15. A computer program product including a non-transitory computer readable storage medium having executable code, the code when executed by a processor to be adapted for performing the following:
 computing at least one web search parameter metric, the web search parameter metric being applied to a new web document and optimizing said new web document for a web search query having a search parameter wherein the at least one web search parameter metric is based on the search parameter;
 fetching the search parameter from a user input device;
 compiling and ranking multiple Uniform Resource Locators (URLs) that are returned upon submission of the web search query and search parameter to a selected search engine, each returned URL being associated with highly-ranked web content including a new document;
 after fetching the new document associated with each returned URL, parsing the new document and its content; and
 displaying a display menu having at least one display area displaying the at least one web search parameter metric, wherein said search parameter usage unit utilizes the search parameter to perform a statistical analysis of content of the new document to determine the at least one web search parameter metric.

16. The computer program product of claim 15 wherein said search parameter is a keyword phrase wherein said keyword phrase is tokenized into individual keywords or subphrases.

17. The computer program product of claim 15 wherein said search parameter is a keyword phrase and wherein said at least one web search parameter metric is computed based on said keyword phrase.

18. The computer program product of claim 17 wherein said keyword phrase comprises two keywords including a first keyword and a second keyword, wherein a first web search parameter metric is computed based on the first keyword of said keyword phrase,
 and wherein a second web search parameter metric is computed based on the second keyword of said keyword phrase.

19. A method comprising:
 performing by using one or more processors associated with one or more computing devices a statistical analysis to yield a web search parameter metric, the web search parameter metric optimizing a new web document for a web search query with a search parameter wherein said web search parameter metric is based on the search parameter;
 upon entry by a user on a user input device, fetching said search parameter;
 compiling and ranking multiple Uniform Resource Locators (URLs) that are returned upon submission of the web search query and search parameter to a selected search engine, each returned URL being associated with highly-ranked web content;
 parsing content of each highly-ranked web content associated with each returned URL; and
 generating a display menu having at least one display area displaying the at least one web search parameter metric, wherein said search parameter is utilized to perform said statistical analysis of content to determine the at least one web search parameter metric.

20. The method of claim 19 wherein said display menu includes a keyword phrase area for receiving the search parameter from a user input device, wherein upon entry of said search parameter, the at least one web search parameter metric is automatically displayed.

21. The method of claim 19 wherein said display menu includes a current usage area for displaying current usage of the search parameter in the new web document.

22. The method of claim 20 wherein said keyword phrase area is configured to receive separate keyword phrases.

23. The method of claim 19 wherein said display menu includes a goal met display area that displays whether the search parameter metric for the new web document has been met.

24. The method of claim 19 wherein said display menu includes plural areas for displaying search parameter metrics for a meta description tag.

\* \* \* \* \*